Figure 3:
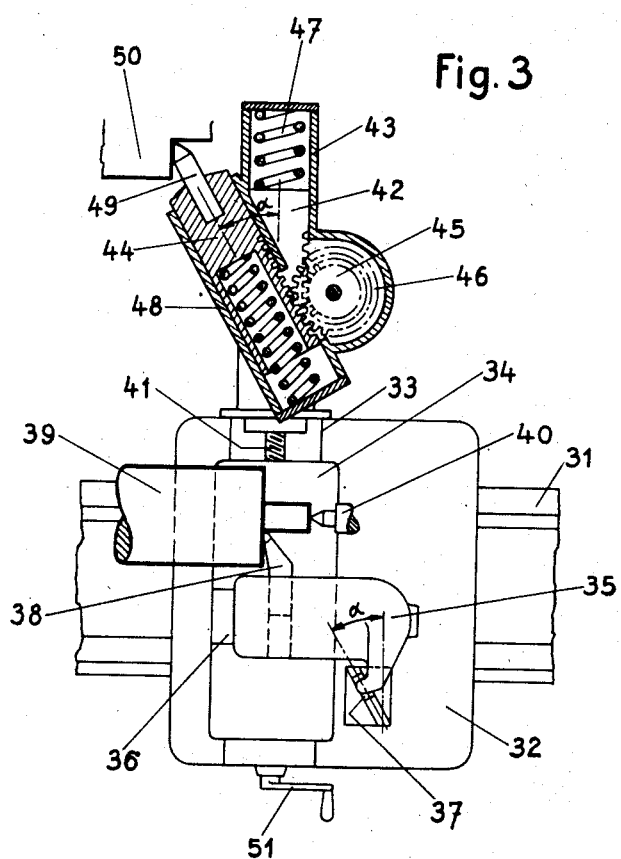

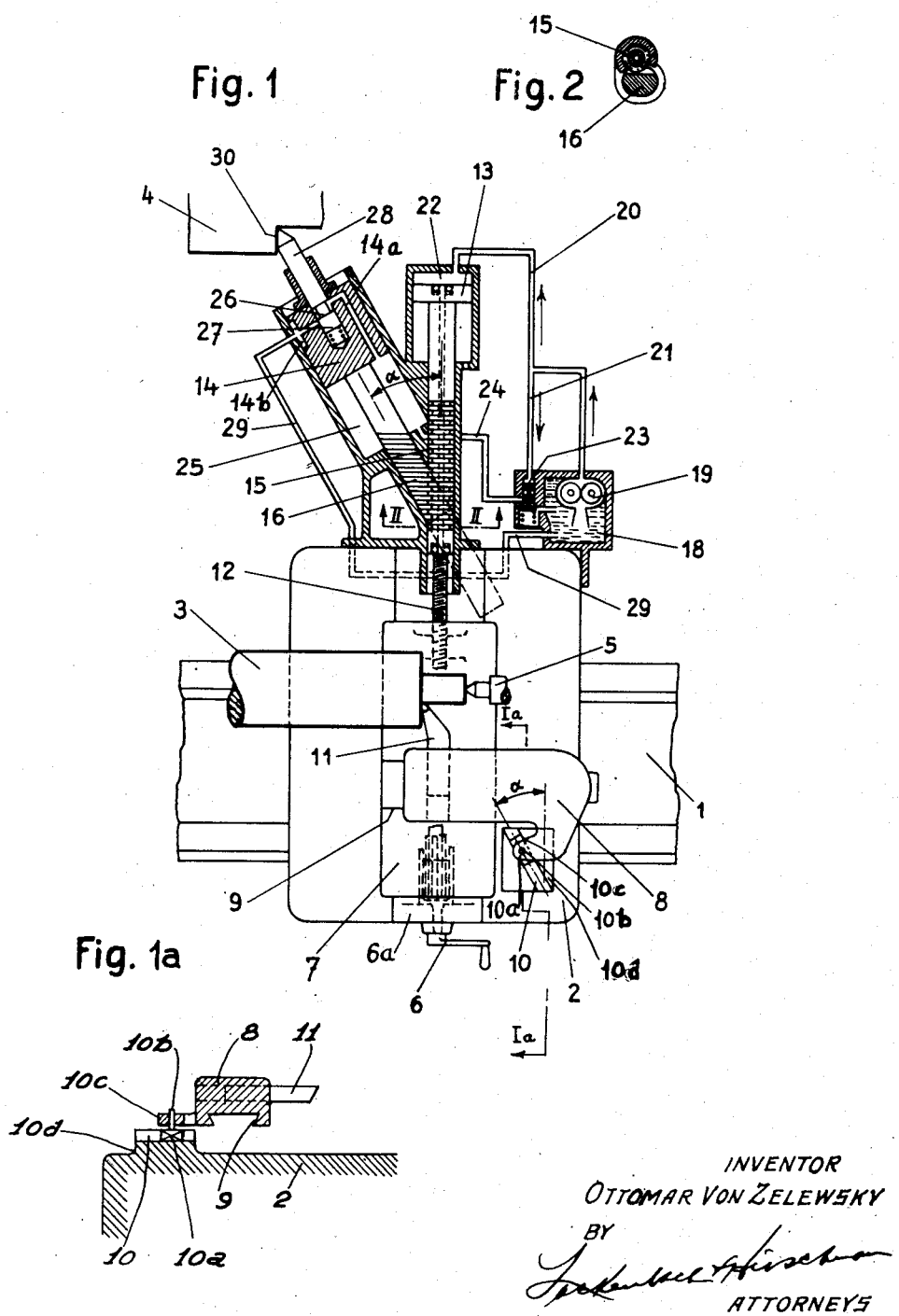

July 21, 1953 O. VON ZELEWSKY 2,645,967
PROFILING ATTACHMENT
Filed March 13, 1946 3 Sheets-Sheet 2

INVENTOR
OTTOMAR VON ZELEWSKY
BY
ATTORNEYS

July 21, 1953     O. VON ZELEWSKY     2,645,967
PROFILING ATTACHMENT
Filed March 13, 1946     3 Sheets-Sheet 3
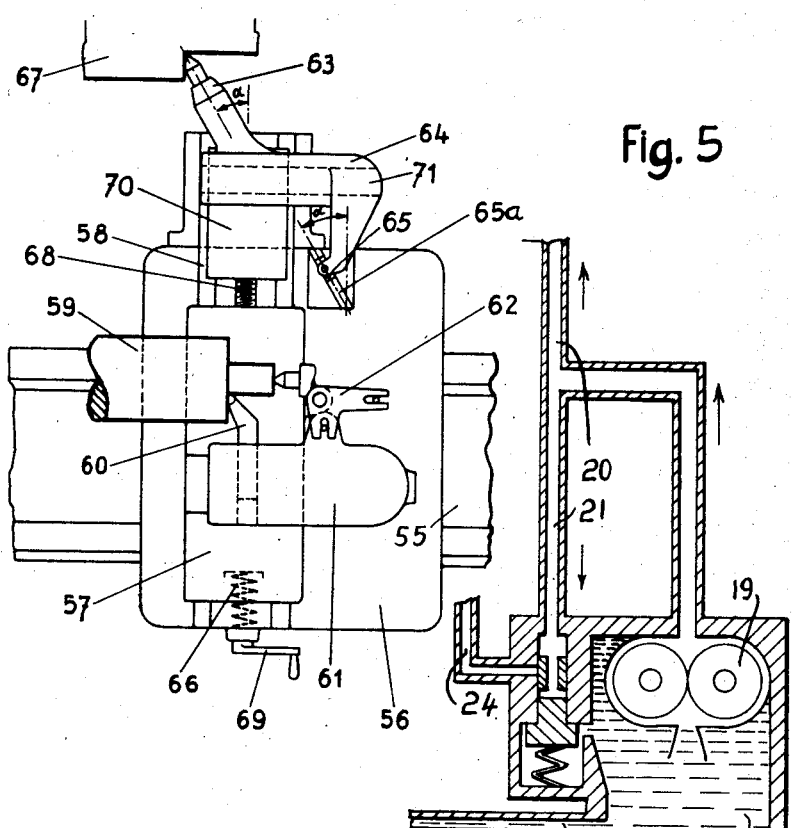
INVENTOR
OTTOMAR VON ZELEWSKY
BY
ATTORNEYS Patented July 21, 1953

2,645,967

UNITED STATES PATENT OFFICE 2,645,967

PROFILING ATTACHMENT

Ottomar von Zelewsky, Neuhausen am Rheinfall, Switzerland, assignor to Aktiengesellschaft der Eisen- und Stahlwerke, vormals Georg Fischer, Schaffhausen, Switzerland, a Swiss company Application March 13, 1946, Serial No. 654,208
In Switzerland May 9, 1945

2 Claims. (Cl. 82—14)

The object of the present invention is a profiling attachment for the reproduction from templates or samples which are stepped vertically to the axis of rotation, with the use of a base slide which can be fed parallel to the spindle axis and a transverse slide which can be fed vertically to the spindle axis. Lathes with such base slides and transverse slides permit of reproducing the steps when copying according to a template only if the angle of the step to the axis of rotation is less than 90°. As soon as right-angled steps have to be reproduced a subsequent treatment with infeed attachment becomes necessary, this increasing the time taken for processing the piece of work.

For copying recesses which lie vertically to the axis of rotation according to untwisted templates or samples with an even feed parallel to the axis, feeler and tool must carry out, in the machining of the vertical recesses during the radial movement of the transverse slide arranged vertically to the axis, a cancelling movement working in the opposite direction to the feed of the base slide.

The present invention fulfils this condition in that the tool set on a top slide and the feeler, which is mounted on a special slide and follows the shape of the template describe, in conjunction with the movement of the transverse slide, parallel resulting movements at a sharp angle to the axis of rotation. Copying with this type of machine can be carried out mechanically or hydraulically. In this form the profiling attachment is specially suited for use on lathes of normal construction.

The diagrams show various embodiments of the invention:

Fig. 1 shows a lathe with hydraulic control of the profiling attachment,

Fig. 1a a section along the line Ia—Ia of Fig. 1,

Fig. 2 a section along the line II—II of Fig. 1,

Fig. 3 a lathe with mechanical profiling attachment,

Fig. 4 a variation of Fig. 3, and

Fig. 5 an enlarged detail of the construction of Fig. 1.

In Fig. 1 and Fig. 2, the numeral 1 signifies the bed of a lathe on which a base slide 2 is arranged in a horizontally adjustable position. The headstock of this lathe is not shown as it does not involve any alterations from known constructions. 3 represents a piece of work which is to be machined according to a template 4. The workpiece 3 is supported by the point of the tail stock 5. By means of a hand crank 6, transverse slide 7 can be fed vertically to the axis of rotation. The top slide 8 moves together with transverse slide 7 and also moves on its slide-way 9. By means of sliding block 10a moving in slide-way 10, the top slide 8 together with cutting tool 11 describes a movement which is oblique to the axis of rotation. As shown in Fig. 1, an extension 10c of the top slide 8 is pivoted by pin 10b to the block 10a, the slideway 10 being formed in a post or boss 10d or the like, disposed on the base slide 2. Crank 6 is connected with screw spindle 12 by means of telescopic coupling 6a. The screw spindle 12 may have an extension of reduced diameter journalled in a bore in the rod of piston 13, as indicated in dotted lines, and ball bearings may be disposed at the free or bottom end of the piston rod and in the upper end of the piston, as shown in Fig. 1, to facilitate the operation of the spindle. The profiling attachment, which engages in this screw spindle 12, consists of hydraulically operated slides or pistons 13 and 14 which are coupled to each other by rack 16 which engages in toothing 15 of the round rack which is secured to the piston 13. In this way only the kinetic components of piston 14 pointing in the direction of the movement of slide 7 are transferred to piston 13. The movements of feeler 28 are transferred to transverse slide 7 by racks 15 and 16 fixed at a sharp angle, that is, an angle of 90° to the axis of rotation. In a collecting tank 18 is a liquid for the hydraulic control of the profiling attachment. This liquid is fed by a pump 19 into pressure conduits 20 and 21. Conduit 20 opens into a pressure space 22 behind piston 13. Conduit 21 ends in a valve 23, which is a combined pressure-reducing and relief valve and keeps the pressure of the liquid in conduits 20 and 21 at a constant level, despite irregularities in the supply pressure. From valve 23 a conduit 24 leads to a pressure space 25 behind piston 14 and through piston 14 by way of channel 14a to cam edge 26 of operating valve 27. Operating valve 27 is controlled directly by feeler 28. The liquid flowing from cam 26 is led back through conduit 29 to collecting tank 18. It will be evident that as the valve 27 controls the leakage of oil from space 25 by way of channel 14a and axial groove 14b, the pressure in such space will be variable, whereas the hydraulic pressure acting in space 22 will remain substantially constant. The two pistons 13 and 14 thus operate as differential pistons.

The attachment described operates as follows: Template 4 is screwed onto two support brackets fastened to bed 1. By means of hand crank 6, cutting tool 11 is applied to the piece of work in such a way that in copying with the selected template position, the exact turning diameter is produced. As soon as pump 19 begins to function, feeler 28 moves diagonally in the direction of the template and thereby draws transverse slide 7 backwards vertically to the axis of rotation, until feeler 28 touches template 4 and begins to copy. The longitudinal feed operates mechanically and in the usual way. The liquid pressure in space 22 and that in space 25 work against each other and in this way prevent a deleterious influence of the flank play of toothings 15 and 16. Every movement of transverse slide 7 necessarily results in a movement of top slide 8 caused by the lateral movement of sliding block 10a in slideway 10, which is fixed at the same angle a as piston 14. Link control 10 causes cutting tool 11 to move parallel to feeler 28. If in the course of the movement of base slide 2, the feeler meets a vertical step 30 of template 4, piston 14 describes a reverse movement until feeler 28 has surmounted step 30. During the reverse movement of piston 14, transverse slide 7 moves forwards and pulls back top slide 8 from template 4 parallel to piston 14 by the amount of the vertical step.

From the foregoing it will be evident that as soon as pump 19 begins to function, the constantly flowing liquid is fed through conduit 20 into space 22 and through conduit 21 to the combined pressure-reducing and relief valve 23; the spring of the latter allows the valve 23 to be depressed a certain amount at a predetermined constant pressure in conduit 21 for opening the passage to conduit 24. As soon as this predetermined pressure is reached in conduits 20 and 21 and in space 22, liquid enters into conduit 24, space 25 and through channel 14a to cam edge 26. If the latter is closed, which is the case when the feeler 28 with the operating valve 27 has been raised by spring 32, then the pressure keeps on rising in conduit 21 because liquid is constantly fed from pump 19. Valve 23 is then depressed further and begins to act as a relief valve as the liquid escapes through the bores of the valve and returns into collecting tank 18.

Owing to the high liquid pressure in space 25 acting on piston 14, the latter, together with the operating valve 27 and the feeler 28, begins to move towards the template 4 until feeler 28 touches the same. Operating valve 27 is then depressed slightly and reaches a balanced condition in relation to the tension of spring 32 in which cam edge 26 stays open a certain amount.

By means of crank 6 and screw spindle 12, cross slide 7 is now moved into the position which produces the desired diameter on the piece of work 3. During the copying operation crank 6 is not further operated. As already indicated, the lathe has a normal and continuous feed for the slide 2 and the rate of feed is not changed during the copying operation.

Assuming that angle a in Fig. 1 is 30°, the feeler tip is to be designed with an included angle of say 58° or less, and the two radii of the tip of feeler 28 and of the tip of cutting tool 11 must be equal in order to obtain contours on the workpiece 3 identical with those on the template 4.

In a hydraulic control system of the described type with continuously flowing pressure medium, the actual control movements of the feeler 28 and of the operating piston 27 are very small (a few hundredths of one millimeter). By these minute movements the variable pressure in space 25 rises or falls whereas the pressure in space 22 is kept constant by means of pressure-regulating valve 23 as described above. The pressure of the feeler 28 on the template 4 amounts only to a few lbs. and if, due to the entirely independent longitudinal feed movement of slide 2, feeler 28 in its balanced condition touches a vertical step 30 or any other change in contour which causes a diameter increase on template 4 the feeler 28 is depressed slightly against the pressure of spring 32. By this depression of the operating valve 27 the passage to conduit 29 is further opened and the variable pressure in space 25 falls. This causes the constant pressure in space 22 to exceed that in space 25 and to force pistons 13 and 14, together with cross slide 7, downwards. As soon as step 30 has been passed, the operating valve 27 obtains its balanced condition again in which the constant pressure in space 22 and the variable pressure in space 25 hold the pistons 13 and 14 in balanced condition.

If the contour of the template 4 presents a diameter decrease for the workpiece 3, then the feeler 28 with the operating valve 27 makes a slight movement to follow this contour change and thereby closes the passage to conduit 29. Now the variable pressure will rise in space 25, and the total pressure acting on piston 14 will exceed the total constant pressure in space 22 acting on the smaller piston 13, and the pistons 13 and 14, as well as cross slide 7, will move upwards until operating valve 27 has obtained its balanced condition again.

In Fig. 3 the numeral 31 signifies the bed of a lathe on which base slide 32 is arranged to move longitudinally. On slide ways 33 glides transverse slide 34 vertically to the axis of rotation. A top slide 35 is mounted on transverse slide 34 with slide ways 36 parallel to the base slide movement. Transverse slide 34 and top slide 35 are rendered dependent on each other in their movements by link control 37. Top slide 35 bears tool 38, in the present case a cutting tool which machines piece of work 39. A tail spindle 40 with a tail stock point is likewise shown in the diagram. Transverse slide 34 is connected to a screw spindle 41; the latter can be turned by hand by means of a hand crank 51. Screw spindle 41 ends in piston 42, which likewise moves backwards and forwards vertically to the axis of rotation in casing 43. A second piston 44 is arranged diagonally to the axis of rotation and coupled with piston 42 by means of the two cog wheels 45 and 46, the number of whose teeth are in the ratio of cos a of the angle between pistons 42 and 44. Springs 47 and 48 exercise a constant pressure on pistons 42 and 44, and in opposite directions, in order to eliminate the flank play of cog wheels 45 and 46. A feeler 49 is inserted in piston 44. Template 50 is fastened to bed 31 of the lathe. Spring 48 overcomes with the force of its pressure the effect of spring 47 and pulls piston 42 with transverse slide 34 backwards vertically to the movement of the base slide, until feeler 49 touches template 50. When copying from template 50, feeler 49 and piston 44 move diagonally to the axis of rotation, and according to the shape of the template towards or away from the latter and cause parallel resulting movements of top slide 35 with cutting tool 38.

The profiling attachment in Fig. 4 also operates according to the same basic principle as the profiling attachment in Figs. 1 and 3. In Fig. 4 a lathe bed 55 is represented with a base slide 56 moving longitudinally. Vertically to the movement of the base slide a transverse slide 57 is fed on slide ways 58 towards piece of work 59. Cutting tool 60 is fastened on a top slide 61 which moves like base slide 56 parallel to the axis of rotation. Between transverse slide 57 and top slide 61 a mechanical connection is formed by bell crank 62, the lever arms of which are in the ratio of tan $a$ to each other, so that with each movement of transverse slide 57 vertically to the axis of rotation, a movement of top slide 61 parallel to the axis of rotation is effected: In this way cutting tool 60 is fed at an oblique angle $a$ to the axis of rotation, that is to say, parallel to the movement of feeler 63. The latter is situated laterally on a further top slide 64, which is led in ways 71 on a second transverse slide 70 sliding on way 58. Spindle 68 is operated by crank 69 and serves to adjust the reciprocal distance between transverse slides 57 and 70 in order to move tool 60, when template 67 is set, to the desired distance from the axis of rotation and thereby to fix the diameter of the piece of work. The sliding block 65 moving in slide-way 65a on the base, slide 56 brings the movement of top slide 64 into relation to the movement of transverse slide 57.

The basic idea of the above-described profiling attachment can be applied not only in the case of longitudinal turning, as shown in Figs. 1-4, but can be used just as well for facing.

I claim:

1. Profiling attachment for copying from templates with steps vertical to the axis of rotation of a workpiece, comprising means for supporting a workpiece for rotation, a base slide adjustable parallel to the axis of rotation, a transverse slide supported on the base slide and adjustable vertically to the axis of rotation, a top slide mounted on the transverse slide and adapted to support a tool; a further slide and a feeler mounted thereon for following the shape of a template, mechanism including a slide block member and cooperating guide member, one of said members being mounted on said base slide and the other said member being mounted on said top slide, and means responsive to the feeler to move said transverse slide, the above mechanism being so constructed and arranged as to effect parallel resulting movement of the tool and feeler at an angle to the axis of rotation.

2. Profiling attachment according to claim 1, wherein said means to move said transverse slide includes two racks mounted on the base slide at an acute angle to each other and coupling the feeler to the movements of the transverse slide.

OTTOMAR von ZELEWSKY.

References Cited in the file of this patent

UNITED STATES PATENTS

| Number | Name | Date |
|---|---|---|
| 1,166,126 | Gridley | Dec. 28, 1915 |
| 1,393,206 | Daniels | Oct. 11, 1921 |
| 1,498,511 | Groene | June 17, 1924 |
| 2,250,241 | Thalmann | July 22, 1941 |
| 2,330,566 | Edmonds | Sept. 28, 1943 |
| 2,331,443 | Von Zelewsky | Oct. 12, 1943 |
| 2,375,831 | Turchan | May 15, 1945 |
| 2,422,682 | Johnson | June 24, 1947 |
| 2,437,570 | Von Zelewsky | Mar. 9, 1948 |

FOREIGN PATENTS

| Number | Country | Date |
|---|---|---|
| 786 | Great Britain | 1892 |